United States Patent
Pan et al.

(10) Patent No.: US 11,928,435 B2
(45) Date of Patent: Mar. 12, 2024

(54) EVENT EXTRACTION METHOD, EVENT EXTRACTION DEVICE, AND ELECTRONIC DEVICE

(71) Applicant: Beijing Baidu Netcom Science and Technology Co., Ltd., Beijing (CN)

(72) Inventors: Lu Pan, Beijing (CN); Yuguang Chen, Beijing (CN); Fayuan Li, Beijing (CN); Cuiyun Han, Beijing (CN); Yuanzhen Liu, Beijing (CN); Jiayan Huang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 779 days.

(21) Appl. No.: 17/034,394

(22) Filed: Sep. 28, 2020

(65) Prior Publication Data

US 2021/0295095 A1 Sep. 23, 2021

(30) Foreign Application Priority Data

Mar. 19, 2020 (CN) .......................... 202010195577.8

(51) Int. Cl.
*G06F 40/30* (2020.01)
*G06F 18/21* (2023.01)
(Continued)

(52) U.S. Cl.
CPC .......... *G06F 40/30* (2020.01); *G06F 18/2113* (2023.01); *G06F 18/213* (2023.01);
(Continued)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| 2005/0033711 A1 | 2/2005 | Horvitz et al. |
| 2008/0183652 A1 | 7/2008 | Prpfio |
| (Continued) | | |

FOREIGN PATENT DOCUMENTS

| CN | 108446320 A | 8/2018 |
| CN | 108681574 A | 10/2018 |
| (Continued) | | |

OTHER PUBLICATIONS

Yi et al., title={Exploring Multiple Embedded Features on Event Extraction}, volume={1267}, number={1}, pp. 1-7, year={2019}, (Year: 2019).*

(Continued)

*Primary Examiner* — Lamont M Spooner
(74) *Attorney, Agent, or Firm* — Quinn IP Law (57) ABSTRACT

The present disclosure provides an event extraction method, an event extraction device and an electronic device, and it relates to the field of computer data processing, in particular to the field of knowledge graph. The event extraction method includes: acquiring text information; determining a plurality of pieces of question information ranked in a sequential order in accordance with the text information; and inputting vector information for each piece of question information into an extraction model in accordance with the sequential order to acquire extraction information for each piece of question information.

7 Claims, 3 Drawing Sheets

(51) Int. Cl.
  *G06F 18/2113* (2023.01)
  *G06F 18/213* (2023.01)
  *G06F 18/25* (2023.01)
  *G06F 40/284* (2020.01)
(52) U.S. Cl.
  CPC ........ *G06F 18/2163* (2023.01); *G06F 18/253* (2023.01); *G06F 40/284* (2020.01)

(56) References Cited

U.S. PATENT DOCUMENTS

| | | | |
|---|---|---|---|
| 2010/0010803 A1 | 1/2010 | Ishikawa et al. | |
| 2012/0110087 A1* | 5/2012 | Culver | G06Q 10/067 709/205 |
| 2014/0201838 A1* | 7/2014 | Varsanyi | G06F 21/552 726/23 |
| 2014/0372102 A1* | 12/2014 | Hagege | G06F 40/295 704/9 |
| 2015/0100616 A1* | 4/2015 | Imamura | G06F 9/4856 709/201 |
| 2016/0283491 A1 | 9/2016 | Lu et al. | |
| 2017/0124220 A1* | 5/2017 | Krueger | G06F 16/2425 |
| 2018/0032316 A1* | 2/2018 | Dinga | G06F 8/33 |
| 2018/0309631 A1* | 10/2018 | Li | H04L 51/56 |
| 2019/0095241 A1* | 3/2019 | Ago | G06F 16/24573 |
| 2019/0304157 A1* | 10/2019 | Amer | G06V 40/23 |
| 2019/0340392 A1* | 11/2019 | Khorrami | G06F 11/3013 |
| 2020/0364307 A1* | 11/2020 | Min | G06F 16/90332 |
| 2020/0387574 A1* | 12/2020 | Min | G06N 3/04 |
| 2021/0286948 A1* | 9/2021 | Kruengkrai | G06N 3/04 |

FOREIGN PATENT DOCUMENTS

| | | |
|---|---|---|
| CN | 109582949 A | 4/2019 |
| CN | 110032641 A | 7/2019 |
| CN | 110134757 A | 8/2019 |
| CN | 110543631 A | 12/2019 |
| CN | 110647629 A | 1/2020 |
| CN | 110795543 A | 2/2020 |
| EP | 2220572 A1 | 8/2010 |
| EP | 3016002 A1 | 4/2016 |
| JP | 2006085381 A | 3/2006 |
| JP | 2016024545 A | 2/2016 |
| WO | 2009062271 A1 | 5/2009 |

OTHER PUBLICATIONS

Huang et al., title={Liberal event extraction and event schema induction}, booktitle={Proceedings of the 54th Annual Meeting of the Association for Computational Linguistics (vol. 1: Long Papers)}, pp. {258-268}, year={2016} (Year: 2016).*
Li et al., title={Entity-relation extraction as multi-turn question answering}, journal={arXiv preprint arXiv:1905.05529}, year={2019}, pp. 1-11 (Year: 2019).*
Japanese Office Action for Japanese Patent Application No. 2021-044655, dated May 25, 2022.
Liu Xiaoming et al, "Chinese Complex Question Analysis Based on Event Extraction", 2010 International Conference on Computer Application and System Modeling, Taiyuan, China, Piscataway, NJ, USA, Oct. 22, 2010, pp. V8-667-V8-670, ISBN: 978-1-4244-7235-2.
Libin Hou et al, "Event Argument Extraction Based on CRF", Jul. 6, 2012, Chinese Lexical Semantics, Springer Berlin Heidelberg, Berlin, Heidelberg, p. 32-39, ISBN: 978-3-642-36336-8, sections 3 & 4.
Sonit Singh, "Natural Language Processing for Information Extraction", Arxiv.Org, Cornell University Library, 201 Olin Library Cornell University Ithaca, NY 14853, Jul. 6, 2018, p. 1-24.
Extended European search report dated Apr. 6, 2021 for EP application No. EP20201859.4.
Chinese Office Action for Chinese Application No. CN2020101955778 dated Feb. 25, 2023.
Chen Bin, "Receach and Application of Event Extraction Based on Long Short-Term Memory Networks," China University of Mining and Technology, May 2019.
Jiang Wen et al., "Online Q&A Community Automatically Information Quality Evaluation with Sentiment Feature," vol. 59, Feb. 2015.

* cited by examiner

EVENT EXTRACTION METHOD, EVENT EXTRACTION DEVICE, AND ELECTRONIC DEVICE

CROSS-REFERENCE TO RELATED APPLICATION

The present application claims a priority to the Chinese patent application No. 202010195577.8 filed in China on Mar. 19, 2020, a disclosure of which is incorporated herein by reference in its entirety.

TECHNICAL FIELD

The present disclosure relates to the field of data processing technology in a computer technology, in particular to an event extraction method, an event extraction device and an electronic device.

BACKGROUND

Information extraction plays a very important role in the processing of huge amounts of data, and event extraction is an important research direction in the field of information extraction. An event extraction task refer to the extraction of structured event information, including an event type, an event trigger and an event argument role of an event, from a text. The event extraction can be applied to various fields. For example, in the financial field, it may be used to for the positioning, quantitative and qualitative analysis of various activities in finance to significantly solve human resource issues. In the medical field, it may be used to rapidly determine a disease of a patient in accordance with a medical certificate and description about a patient's symptom, so as to enable the patient to know the disease in a more accurate manner.

However, for a current event extraction method, its extraction effect is not well, and the accuracy of the structured information acquired through the event extraction is low.

SUMMARY

In one aspect, the present disclosure provides in some embodiments an event extraction method, including: acquiring text information; determining a plurality of pieces of question information ranked in a sequential order in accordance with the text information; inputting vector information for each piece of question information into an extraction model in accordance with the sequential order to acquire extraction information for each piece of question information, the vector information including an answer mark vector; and determining an event extraction result of the text information in accordance with the extraction information for each piece of question information.

In a possible embodiment of the present disclosure, an answer mark vector for first question information ranged first in the plurality of pieces of question information is determined in accordance with an initial mark of the text information, and an answer mark vector for second question information ranked after the first question information in the plurality of pieces of question information is determined in accordance with the extraction information for at least one piece of question information before the second question information.

In a possible embodiment of the present disclosure, the vector information further includes a position vector. Subsequent to determining the plurality of pieces of question information ranked in a sequential order in accordance with the text information, and prior to inputting the vector information for each piece of question information into the extraction model in accordance with the sequential order to acquire the extraction information for each piece of question information, the event extraction method further includes: performing word segmentation on each piece of question information to acquire at least one target word; acquiring a position vector of each of the at least one target word; and determining a position vector of the question information in accordance with the position vector of each of the at least one target word.

In a possible embodiment of the present disclosure, the acquiring the position vector of each of the at least one target word includes: when the quantity of entities included in the question information is greater than or equal to M and the quantity of verbs included in the question information is greater than or equal to N, acquiring M entities and N verbs in the question information, M and N being each a positive integer; calculating M first relative positions of each of the at least one target word relative to the M entities and N second relative positions of each of the at least one target word relative to the N verbs; mapping the M first relative positions and the N second relative positions to normally-distributed vectors with predetermined dimensions, to acquire M first position vectors and N second position vectors; splicing the M first position vectors in accordance with a sequential order of the M entities in the question information to acquire a first spliced vector; splicing the N second position vectors in accordance with a sequential order of the N verbs in the question information to acquire a second spliced vector; and splicing the first spliced vector with the second spliced vector and taking a splicing result as the position vector of the target word.

In a possible embodiment of the present disclosure, the acquiring the M entities and the N verbs in the question information when the quantity of entities included in the question information is greater than or equal to M and the quantity of verbs included in the question information is greater than or equal to N includes: when the quantity of entities included in the question information is greater than M and the quantity of verbs included in the question information is greater than or equal to N, or when the quantity of verbs included in the question information is greater than N and the quantity of entities included in the question information is greater than or equal to M, performing syntax dependency analysis on the question information to acquire a plurality of dependency pairs; selecting entities and verbs included in a same dependency pair in the plurality of dependency pairs to acquire m entities and n verbs, m and n being each a positive integer; when m is smaller than M, selecting i entities from the entities in the question information other than the m entities, i being a difference between M and m; and when n is smaller than N, selecting j verbs from the verbs in the question information other than the n verbs, j being a difference between N and n.

In a possible embodiment of the present disclosure, the determining the plurality of pieces of question information ranked in the sequential order in accordance with the text information includes: determining an event type of the text information in accordance with the text information; determining a plurality of event argument roles in accordance with the event type; splicing the event type with each event argument role in the plurality of event argument roles to determine a plurality of questions; splicing each question in the plurality of questions with the text information to acquire the plurality of pieces of question information; and ranking the plurality of pieces of question information corresponding to the event argument roles in accordance with an order of the event argument roles in the event type, so as to determine the plurality of pieces of question information ranked in the sequential order.

In another aspect, the present disclosure provides in some embodiments an event extraction device, including: a first acquisition module configured to acquire text information; a first determination module configured to determine a plurality of pieces of question information ranked in a sequential order in accordance with the text information; a second acquisition module configured to input vector information for each piece of question information into an extraction model in accordance with the sequential order to acquire extraction information for each piece of question information, the vector information including an answer mark vector; and a second determination module configured to determine an event extraction result of the text information in accordance with the extraction information for each piece of question information.

In a possible embodiment of the present disclosure, an answer mark vector for first question information ranged first in the plurality of pieces of question information is determined in accordance with an initial mark of the text information, and an answer mark vector for second question information ranked after the first question information in the plurality of pieces of question information is determined in accordance with the extraction information for at least one piece of question information before the second question information.

In a possible embodiment of the present disclosure, the vector information further includes a position vector. The event extraction device further includes: a word segmentation module configured to perform word segmentation on each piece of question information to acquire at least one target word; a third acquisition module configured to acquire a position vector of each of the at least one target word; and a third determination module configured to determine a position vector of the question information in accordance with the position vector of each of the at least one target word.

In a possible embodiment of the present disclosure, the third acquisition module includes: a first acquisition sub-module configured to, when the quantity of entities included in the question information is greater than or equal to M and the quantity of verbs included in the question information is greater than or equal to N, acquire M entities and N verbs in the question information, M and N being each a positive integer; a calculation sub-module configured to calculate M first relative positions of each of the at least one target word relative to the M entities and N second relative positions of each of the at least one target word relative to the N verbs; a mapping sub-module configured to map the M first relative positions and the N second relative positions to normally-distributed vectors with predetermined dimensions, to acquire M first position vectors and N second position vectors; a second acquisition sub-module configured to splice the M first position vectors in accordance with a sequential order of the M entities in the question information to acquire a first spliced vector; a third acquisition sub-module configured to splice the N second position vectors in accordance with a sequential order of the N verbs in the question information to acquire a second spliced vector; and a fourth acquisition sub-module configured to splice the first spliced vector with the second spliced vector and taking a splicing result as the position vector of the target word.

In a possible embodiment of the present disclosure, the first acquisition sub-module includes: a first acquisition unit configured to, when the quantity of entities included in the question information is greater than M and the quantity of verbs included in the question information is greater than or equal to N, or when the quantity of verbs included in the question information is greater than N and the quantity of entities included in the question information is greater than or equal to M, perform syntax dependency analysis on the question information to acquire a plurality of dependency pairs; a second acquisition unit configured to select entities and verbs included in a same dependency pair in the plurality of dependency pairs to acquire m entities and n verbs, m and n being each a positive integer; a third acquisition unit configured to, when m is smaller than M, select i entities from the entities in the question information other than the m entities, i being a difference between M and m; and a fourth acquisition unit configured to, when n is smaller than N, select j verbs from the verbs in the question information other than the n verbs, j being a difference between N and n.

In a possible embodiment of the present disclosure, the first acquisition module includes: a first determination sub-module configured to determine an event type of the text information in accordance with the text information; a second determination sub-module configured to determine a plurality of event argument roles in accordance with the event type; a third determination sub-module configured to splice the event type with each event argument role in the plurality of event argument roles to determine a plurality of questions; a splicing sub-module configured to splice each question in the plurality of questions with the text information to acquire the plurality of pieces of question information; and a fourth determination sub-module configured to rank the plurality of pieces of question information corresponding to the event argument roles in accordance with an order of the event argument roles in the event type, so as to determine the plurality of pieces of question information ranked in the sequential order.

In yet another aspect, the present disclosure provides in some embodiments an electronic device, including at least one processor, and a memory communicating with the at least one processor and storing therein instructions executed by the at least one processor. The at least one processor is configured to execute the instructions so as to implement the above-mentioned event extraction method.

In still yet another aspect, the present disclosure provides in some embodiments a non-transient computer-readable storage medium storing therein computer instructions. The computer instructions are executed by a computer so as to implement the above-mentioned event extraction method.

BRIEF DESCRIPTION OF THE DRAWINGS

The drawings are for illustrative purposes only, but shall not be construed as limiting the present disclosure. In these drawings.

DETAILED DESCRIPTION

The present disclosure will be described hereinafter in conjunction with the drawings and embodiments. Details in the embodiments of the present disclosure are illustratively provided to facilitate the understanding of the present disclosure. Hence, it should be appreciated that, a person skilled in the art may make various alterations and modifications without departing from the scope and spirit of the present disclosure. Identically, for clarification, the description on known functions and structures will be omitted hereinafter.

Figure 1:
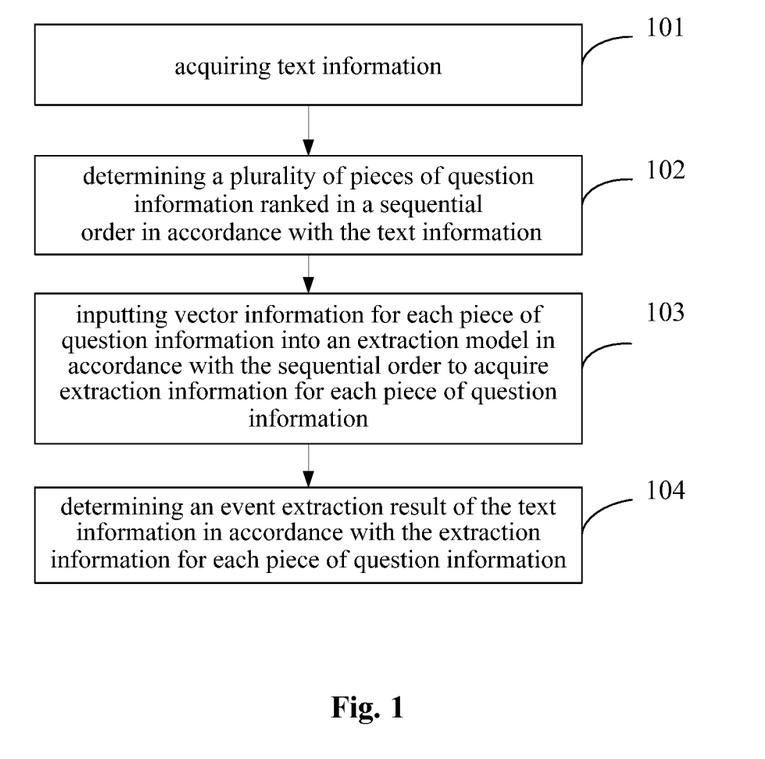
FIG. 1 is a flow chart of an event extraction method according to one embodiment of the present disclosure.

As shown in FIG. 1, the present disclosure provides in some embodiments an event extraction method for an electronic device, which includes the following steps.

Step 101: acquiring text information.

The text information may be information inputted by a user, or information about a search result acquired after a query is performed by a search engine in accordance with query information inputted by the user. The text information may be a piece of text.

Step 102: determining a plurality of pieces of question information ranked in a sequential order in accordance with the text information.

Usually, event extraction may include the extraction of an event trigger and the extraction of an event argument. Through the event trigger in the text information, an event type may be defined. In each event type, there is a corresponding role, i.e., a corresponding event argument role.

The plurality of pieces of question information may be determined in accordance with the text information, e.g., in accordance with the event argument roles in the event type of text information. One piece of question information may be determined in accordance with each event argument role, and the sequential order of the plurality of pieces of question information may be determined in accordance with an order of the event argument roles in the event type.

Step 103: inputting vector information for each piece of question information into an extraction model in accordance with the sequential order to acquire extraction information for each piece of question information, the vector information including an answer mark vector.

An answer mark vector for first question information ranged first in the plurality of pieces of question information may be determined in accordance with an initial mark of the text information, and an answer mark vector for second question information ranked after the first question information in the plurality of pieces of question information may be determined in accordance with the extraction information for at least one piece of question information before the second question information. In this way, when acquiring the extraction information for the second question information, the extraction information for at least one piece of question information before the second question information may be taken into consideration. Answers corresponding to the plurality of pieces of question information are different from each other, so when determining the second question information on the basis of answers for the other pieces of question information, the answers for the other pieces of question information may be excluded. As a result, it is able to narrow a range when determining the extraction information for the second question information, thereby to improve the information extraction speed and accuracy.

The answer mark vector for each question information may be determined in accordance with the extraction information for the other pieces of question information before the question information. The answer corresponding to each question information may be determined in accordance with the extraction information corresponding to the question information, and the answer may be a word or words in the text information.

The plurality of pieces of question information maybe ranged in the sequential order, so from the second question information, the answer mark vector of each question information may be determined in accordance with the extraction information for the other question information before the question information. For example, when the plurality of pieces of question information includes first question information, second question information and third question information ranked sequentially, an answer mark vector for the second question information may be determined in accordance with the extraction information for the first question information, and an answer mark vector for the third question information may be determined in accordance with the extraction information for the first question information and the second question information.

The answer mark vector for the question information ranked first may be determined in accordance with the initial mark of the text information. For example, the initial mark of each word in the text information may be 0, and the answer mark vector for the first question information may be determined in accordance with the initial mark of the text information. When a certain word is the answer for the question information before the second question information, the word in the text information may be marked as 1 (a word which is not the answer for the question information before the second question information may be still marked as 0), and then the answer mark vector for the second question information may be determined in accordance with the mark. In other words, the vector information for the plurality of pieces of question information may be sequentially inputted into the extraction model. The vector information for one piece of question information may be inputted into the extraction model each time, and then the extraction model may output the extraction information for the question information; this may be considered as one extraction round. The extraction information may include a start position and an end position of each answer in the text information. A specific position in the text information may be determined in accordance with the extraction information to acquire an extracted content (including word or phrase), and the extracted content may be considered as the answer for the question information.

The answer acquired in a previous extraction round may be marked in the text information. For example, a word that is the answer for the previous question information in the text information may be marked as 1 (e.g., the mark may be located under the word), and a word that is not the answer for the previous question information may be marked as 0. A new answer mark vector for current question information may be acquired in accordance with the marked text information.

The extraction information may include the start position and the end position of each answer for the question information in the text information. The specific position in the text information may be determined in accordance with the extraction information, so as to determine the answer for the question information.

Step 104: determining an event extraction result of the text information in accordance with the extraction information for each piece of question information.

The answer for each question information, i.e., the event extraction result of the text information, may be acquired in accordance with the extraction information for the question information.

A training sample for the extraction model may include vector information acquired in accordance with training corpus, and a neural network model may be trained using the vector information acquired in accordance with the training corpus to acquire the extraction model. A mode of acquiring the vector information in accordance with the training corpus may be the same as the mode of acquiring the vector information in accordance with the text information mentioned in the embodiments of the present disclosure, and thus will not be particularly defined herein.

In the embodiments of the present disclosure, the text information may be acquired, and the plurality of pieces of question information ranked in the sequential order may be determined in accordance with the text information. Next, the vector information for each piece of question information may be inputted into the extraction model in accordance with the sequential order to acquire the extraction information for each piece of question information, and the vector information may include the answer mark vector. Then, the event extraction result of the text information may be determined in accordance with the extraction information for each piece of question information. During the extraction from the text information through the extraction model, the plurality of pieces of question information may be extracted sequentially. The answers corresponding to the plurality of pieces of question information may be different from each other, so when determining the answer for the question information extracted subsequently on the basis of the answer for the question information extracted previously, the answer for the question information extracted previously may be excluded. As a result, it is able to narrow a range of the extraction information for the question information to be extracted subsequently, thereby to improve the information extraction speed and accuracy.

In a possible embodiment of the present disclosure, the determining the plurality of pieces of question information ranked in the sequential order in accordance with the text information may include: determining an event type of the text information in accordance with the text information; determining a plurality of event argument roles in accordance with the event type; splicing the event type with each event argument role in the plurality of event argument roles to determine a plurality of questions; splicing each question in the plurality of questions with the text information to acquire the plurality of pieces of question information; and ranking the plurality of pieces of question information corresponding to the event argument roles in accordance with an order of the event argument roles in the event type, so as to determine the plurality of pieces of question information ranked in the sequential order.

One implementation mode of determining the plurality of pieces of question information in accordance with the text information will be described hereinafter.

At first, the even type of the text information may be determined in accordance with the text information. The event type may be defined through an event trigger of the text information. Seven event types and thirty event subtypes have been defined in ACE, and eight event types and fifteen event subtypes have been defined in TAC. There are corresponding roles, i.e., event argument roles, in each event type.

One question may be determined in accordance with each event argument role. For example, the event type may be spliced with the event argument roles to acquire a plurality of questions. During the splicing, a name of the event type maybe spliced with a name of each event argument role to acquire one question. Further, the questions may be spliced with the text information to acquire the plurality of pieces of question information. In each question information, a tail of the question and a tail of the text information may each be marked with a predetermined character. For example, [SEP] may be used as the predetermined character to mark an end position. The question information may be considered as a piece of text.

The plurality of event argument roles determined in accordance with the event type may be ranged in a sequential order. Hence, the question information corresponding to the event argument roles may be ranked in accordance with the order of the event argument roles in the event type, so as to determine the plurality of pieces of question information ranked in the sequential order. For example, when the event type is A, three event argument roles corresponding to A sequentially include an event argument role 1, an event argument role 2 and an event argument role 3, and three pieces of question information, i.e., question information 1, question information 2 and question information 3, are created in accordance with the event argument role 1, the event argument role 2 and the event argument role 3 respectively, the question information 1, the question information 2 and the question information 3 may be ranked sequentially.

In the embodiments of the present disclosure, when determining the plurality of pieces of question information ranked in the sequential order in accordance with the text information, the plurality of pieces of question information may be created in accordance with the plurality of event argument roles in the event type of the text information, and then the sequential order of the plurality of pieces of question information may be determined in accordance with the order of the plurality of event argument roles in the event type, so as to sequentially determine the answers for the plurality of pieces of question information in accordance with the sequential order of the plurality of pieces of question information. In addition, when an answer for a current piece of question information is determined, the answer for the other piece of question information before the current piece of question information may be excluded, so as to narrow a search range of the answer for the current piece of question information, thereby to improve the efficiency and accuracy.

In a possible embodiment of the present disclosure, the vector information may further include a position vector. Subsequent to determining the plurality of pieces of question information ranked in a sequential order in accordance with the text information, and prior to inputting the vector information for each piece of question information into the extraction model in accordance with the sequential order to acquire the extraction information for each piece of question information, the event extraction method may further include: performing word segmentation on each of a plurality of question information to acquire at least one target word; acquiring a position vector of each of the at least one target word; and determining a position vector of the question information in accordance with the position vector of each of the at least one target word.

The question information may be considered as a piece of text. A position vector may be acquired for each piece of question information as follows. At first, the word segmentation may be performed on each piece of question information to acquire one or more words, and each word acquired after the word segmentation may be the target word. For example, when the question information is "Xiaoming arrives Chinatown", three words, i.e., "Xiaoming", "arrives" and "Chinatown" may be acquired after the word segmentation, and these words may be just the target words. Then, a position vector of each target word may be acquired, and one target word may correspond to one position vector. The position vector of each target word may be determined in accordance with a position of the target word relative to the entities and verbs in the question information, e.g., a distance between the target word and each entity in the question information and a distance between the target word and each verb in the question information. The word representing person, organization, location or institution may be considered as the entity. Finally, the position vectors of the target words may be spliced to acquire the position vector of the question information. For example, when the question information includes two target words and position vectors of the two target words are A and B respectively, A may be spliced with B in terms of characters, so as to acquire the position vector of the question information. Here, characters A and B are used to represent two position vectors, but shall not be construed as expressions for the position vectors. For each piece of question information, the above acquisition procedure may be repeated, so as to acquire the position vector of each piece of question information.

The vector information for the question information may further include a word vector and part of speech (POS) embedding. An acquisition procedure of the word vector will be described as follows. The target word may be inputted into an unsupervised model to acquire a word vector of each target word. Training samples of the unsupervised model may include a news title and a news body. Next, the word vectors of the target words may be spliced to acquire the word vector of the question information. The POS embedding may refer to the mapping of a part of speech of each target word to a multi-dimensional vector, and a same part of speech may be initialized using a same vector. During the training of a recognition model, a value of the POS embedding may be optimized in accordance with different training corpus and targets, and then the POS embedding of the target words may be spliced to acquire the POS embedding of the question information.

The vector information of the question information may further include a noun vector and a pronoun vector. A noun may be extracted through a language tool, and it may be a name of an entity, e.g., person, institution or place. A pronoun, e.g., "he", "she" or "it", may be acquired in accordance with a predetermined rule.

In the embodiments of the present disclosure, the vector information may further include the position vector of the question information. The word segmentation may be performed on each of the plurality of pieces of question information to acquire at least one target word, the position vector of each of the at least one target word may be acquired, and then the position vector of the question information may be determined in accordance with the position vector of each of the at least one target word. The position vector of the question information may include relative positions of each target word in the question information relative to the entities and verbs in the question information. Through making full use of relationships between each target word and the entities as well as the verbs, it is able to further improve the information extraction accuracy.

In a possible embodiment of the present disclosure, the acquiring the position vector of each of the at least one target word may include: when the quantity of entities included in the question information is greater than or equal to M and the quantity of verbs included in the question information is greater than or equal to N, acquiring M entities and N verbs in the question information, M and N being each a positive integer; calculating M first relative positions of each of the at least one target word relative to the M entities and N second relative positions of each of the at least one target word relative to the N verbs; mapping the M first relative positions and the N second relative positions to a normally-distributed vector with predetermined dimensions, to acquire M first position vectors and N second position vectors; splicing the M first position vectors in accordance with a sequential order of the M entities in the question information to acquire a first spliced vector; splicing the N second position vectors in accordance with a sequential order of the N verbs in the question information to acquire a second spliced vector; and splicing the first spliced vector with the second spliced vector and taking a splicing result as the position vector of the target word.

In the embodiments of the present disclosure, M and N may each be a predetermined value. For example, M may be 2 and N may be 1. Preferably, M may be 3 and N may be 2. When the quantity of entities included in the question information is greater than or equal to M and the quantity of verbs included in the question information is greater than or equal to N, i.e., when the quantity of entities included and the quantity of verbs included in the question information are each not smaller than the predetermined value, M entities and N verbs may be acquired from the question information.

For each of the at least one target word, M first relative positions of the target word relative to the M entities may be calculated, and N second relative positions of the target word relative to the N verbs may be calculated. For example, when the at least one target word includes a first target word and a second target word, the entities include a first entity and a second entity, and the verbs include a first verb, one first relative position of the first target word relative to the first entity and another first relative position of the first target word relative to the second entity may be calculated, i.e., two first relative positions may be acquired; and a second relative position of the first target word relative to the first verb may be calculated, i.e., one second relative position may be acquired.

Identically, one first relative position of the second target word relative to the first entity and another first relative position of the second target word relative to the second entity may be calculated, i.e., two first relative positions may be acquired; and a second relative position of the second target word relative to the first verb may be calculated, i.e., one second relative position may be acquired.

Then, the M first relative positions and the N second relative positions corresponding to each target word may be mapped to normally-distributed vectors with predetermined dimensions, to acquire M first position vectors and N second position vectors. The predetermined dimensions may be set according to the practical need, which will not be particularly defined herein.

Further, the M first position vectors corresponding to each target word may be spliced in accordance with a sequential order of the M entities in the question information, to acquire the first spliced vector. The N second position vectors corresponding to each target word may be spliced in accordance with a sequential order of the N verbs in the question information, to acquire the second spliced vector. The term "splice" may be understood as splicing strings, i.e., splicing the strings of the M first position vectors in an end-to-end manner.

Then, the first spliced vector and the second spliced vector corresponding to each target may be spliced, and the splicing result may be taken as the position vector of the target word. In the embodiments of the present disclosure, the term "splice" may be understood as splicing strings of the first spliced vector and the second spliced vector in an end-to-end manner.

In the embodiments of the present disclosure, the M entities and the N verbs may be selected from the question information. Next, for each target word of the at least one target word, the M first relative positions of the target word relative to the M entities and the N second relative positions of the target word relative to the N verbs may be calculated. Next, the M first relative positions and the N second relative positions may be mapped to the normally-distributed vectors with the predetermined dimensions, to acquire M first position vectors and N second position vectors. Next, the M first position vectors may be spliced in accordance with the sequential order of the M entities in the question information to acquire the first spliced vector, and the N second position vectors may be spliced in accordance with the sequential order of the N entities in the question information to acquire the second spliced vector. Then, the first spliced vector may be spliced with the second spliced vector, and the splicing result may be taken as the position vector of the target word. The position vector of the target word may include the relative positions of the target word relative to the entities and verbs in the question information. Through making full use of relationships between each target word and the entities as well as the verbs, it is able to further improve the information extraction accuracy.

In a possible embodiment of the present disclosure, the acquiring the M entities and the N verbs in the question information when the quantity of entities included in the question information is greater than or equal to M and the quantity of verbs included in the question information is greater than or equal to N may include: when the quantity of entities included in the question information is greater than M and the quantity of verbs included in the question information is greater than or equal to N, or when the quantity of verbs included in the question information is greater than N and the quantity of entities included in the question information is greater than or equal to M, performing syntax dependency analysis on the question information to acquire a plurality of dependency pairs; selecting entities and verbs included in a same dependency pair in the plurality of dependency pairs to acquire m entities and n verbs, m and n being each a positive integer; when m is smaller than M, selecting i entities from the entities in the question information other than the m entities, i being a difference between M and m; and when n is smaller than N, selecting j verbs from the verbs in the question information other than the n verbs, j being a difference between N and n.

In the embodiments of the present disclosure, when the quantity of entities in the question information is greater than M and the quantity of verbs is not smaller than N, or when the quantity of verbs in the question information is greater than N and the quantity of entities is not smaller than M, the M entities and the N verbs need to be selected from the entities and the verbs in the question information respectively.

During the selection, the entities and verbs in a same dependency pair may be selected preferentially, i.e., there is a direct dependency relationship between the entity and the verb, and the entity and the verb may form one dependency pair. For example, for the question information "Zhangsan shouted at Lisi for asking Lisi to call Wangwu", there is a direct relationship between "Zhangsan" and "shout", so "Zhangsan" and "shout" may belong to a same dependency pair. There is no direct relationship between "Zhangsan" and "call". Hence, the entities "Zhangsan" and "shout" in the same dependency pair may be selected preferentially.

After the selection of all the entities and verbs in the same dependency pairs, when the quantity of entities is smaller than M, i entities may be selected from the remaining entities in the question information, so that the total quantity of the selected entities is M. The i entities may be selected from the remaining entities in the question information in accordance with the importance of the remaining entities, or in accordance with the sequential order of the remaining entities in the question information, which will not be particularly defined herein.

When the quantity of verbs is smaller than N, j verbs may be selected from the remaining verbs in the question information, so that the total quantity of the selected verbs is N. The j verbs may be selected from the remaining verbs in the question information in accordance with the importance of the remaining verbs, or in accordance with the sequential order of the remaining verbs in the question information, which will not be particularly defined herein.

In the embodiments of the present disclosure, when the quantity of entities in the question information is greater than M and the quantity of verb in the question information is greater than or equal to N, or when the quantity of verbs in the question information is greater than N and the quantity of entities in the question information is greater than or equal to M, the syntax dependency analysis may be performed on the question information to acquire the plurality of dependency pairs, and the entities and verbs in a same dependency pair may be selected in the plurality of dependency pairs, so as to improve the information extraction accuracy.

In a possible embodiment of the present disclosure, the acquiring the position information of each of the at least one target word may include: for each of the at least one target word, when the quantity U of entities included in the question information is smaller than M, acquiring U first relative positions of the target word relative to the U entities, U and M being each a positive integer; initializing the U first relative positions using a zero vector, so as to acquire M first relative positions; when the quantity V of verbs included in the question information is smaller than N, acquiring V second relative positions of the target word relative to the V verbs, V and N being each a positive integer; initializing the V second relative positions using the zero vector, so as to acquire N second relative positions; mapping the M first relative positions and the N second relative positions to the normally-distributed vectors, so as to acquire M first position vectors and N second position vectors; splicing the M first position vectors in accordance with a sequential order of the M entities in the question information to acquire a first spliced vector; splicing the N second position vectors in accordance with a sequential order of the N verbs in the question information to acquire a second spliced vector; and splicing the first spliced vector with the second spliced vector and taking a splicing result as the position vector of the target word.

This embodiment relates to a case where the quantity of entities or verbs in the question information is smaller than a predetermined value. M and N may each be a predetermined value. Preferably, M may be 3 and N may be 2.

When the quantity U of entities included in the question information is smaller than M, the U first relative positions of the target word relative to the U entities maybe acquired, and then the U first relative positions may be initialized using the zero vector to acquire the M first relative positions. During the initialization, one or more zero vectors may be filled into the U first relative positions to acquire the M first relative positions. One zero vector may have a same length as one position vector. When the quantity V of verbs included in the question information is smaller than N, the V second relative positions of the target word relative to the V verbs may be acquired, and then the V second relative positions may be initialized using the zero vector to acquire the N second relative positions. During the initialization, one or more zero vectors may be filled into the V second relative positions, so as to acquire the N second relative positions. One zero vector may have a same length as one position vector. Finally, the M first relative positions and the N second relative positions may be mapped to the normally-distributed vectors, so as to acquire the M first position vectors and the N second position vectors. The M first position vectors may be spliced in accordance with the sequential order of the M entities in the question information to acquire the first spliced vector, and the N second position vectors may be spliced in accordance with the sequential order of the N verbs in the question information to acquire the second spliced vector. Then, the first spliced vector may be spliced with the second spliced vector, and the splicing result may be taken as the position vector of the target word. All the target words in the question information may be handled in the above-mentioned mode, so as to acquire the position vector corresponding to each target word.

In the embodiments of the present disclosure, when the quantity of entities or verbs in the question information is smaller than the predetermined value, the U first relative positions or V second relative positions may be initialized using the zero vector, so as to acquire the M first relative positions and the N second relative positions, thereby to finally acquire the position vector corresponding to each target word. The position vector of the question information may include the relative positions of each target word in the question information relative to the entities and verbs in the question information. Through making full use of relationships between each target word and the entities as well as the verbs, it is able to further improve the information extraction accuracy.

Figure 2:
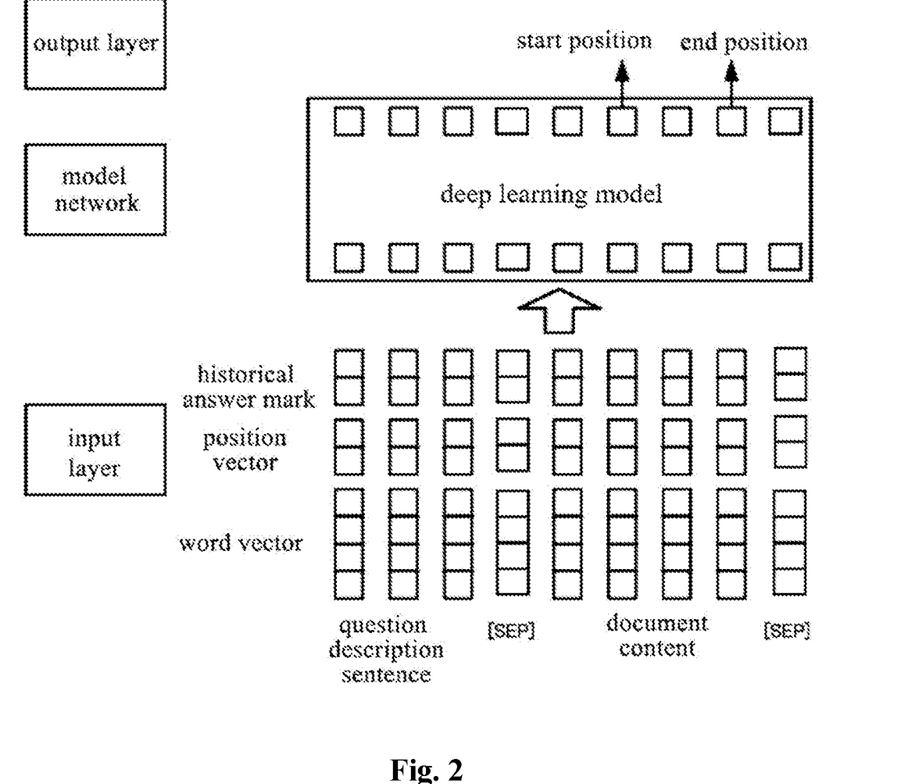
FIG. 2 is a schematic view showing layers of an extraction model according to one embodiment of the present disclosure.

In the embodiments of the present disclosure, the word vector, the position vector and the answer mark vector acquired in accordance with the question information may be applied to a training stage of the extraction model. FIG. 2 shows layers of the extraction model.

Input layer: a word vector, a position vector and an answer mark vector acquired in accordance with a created question-document pair <question, document> may be inputted into the input layer. The question may be acquired through splicing the even type of the training corpus with a name of one event argument role, and the document (i.e., the training corpus) may be a potential content containing an answer for an event argument. One question and one document may be spliced into one sentence (i.e., the question information), and tails of the question and the document may be marked with [SEP]. The word segmentation may be performed on the sentence acquired through splicing, so as to acquire the target words. Each target word includes a word vector and a position vector. A word vector and a position vector of the sentence may be acquired in accordance with the word vector and the position vector of each target word respectively. In addition, an answer mark vector of the sentence, i.e., a position of an answer for a previous piece of question information in the document, may be acquired. A position of the question information for which the answer has been acquired may be marked as 1, and a position of the question information for which the answer has not been acquired yet may be marked as 0. Then, the document with marks may be converted into a vector as the answer mark vector.

Mode network: a basic neural network model may be adopted.

Output layer: a start position and an end position of an answer for a current piece of question information in the document may be outputted.

Figure 3:
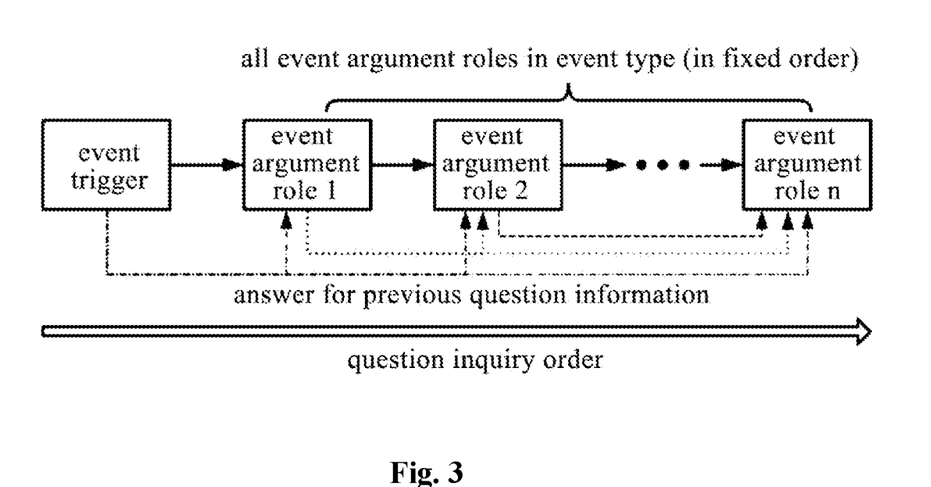
FIG. 3 is a schematic view showing a processing order of a plurality of pieces of question information determined in accordance with event argument roles according to one embodiment of the present disclosure.

FIG. 3 shows the processing of the plurality of pieces of question information determined in accordance with the event argument roles in the event type. As shown in FIG. 3, for an order of questions to be inquired, an event trigger of an event may be inquired at first, and then all the event argument roles in the event may be inquired. An order of the event argument roles may be fixed. For a current-round inquiry, answers previously acquired through inquiring the question information and outputted may be combined to generate a historical answer mark in a current inquiry condition. When a certain character in the training corpus (or the text information) is an answer for a previous inquiry process, a position of the character may be marked as 1, and otherwise it may be marked as 0.

As shown in FIG. 3, an output result (i.e., the extraction information) of an event argument role (specifically the question information determined in accordance with the event argument role) ranked behind may be influenced by an output result of an event argument role ranked ahead.

In the embodiments of the present disclosure, through creating the questions on the basis of the event argument roles, the target answers may be learned using a reading comprehension technique. In addition, a plurality of event argument roles may not be allocated for a same answer, so when acquiring the answers for different event argument roles, the acquired answers may be taken as a part of a feature, so as to reduce the quantity of candidate items for the extraction model, thereby to further improve the extraction effect. Through the event extraction on the text information to acquire the structured information, it is able to improve a capability of the electronic device for understanding contents in a text, and help reduce a large quantity of information, thereby to further improve the labor efficiency.

Figure 4:
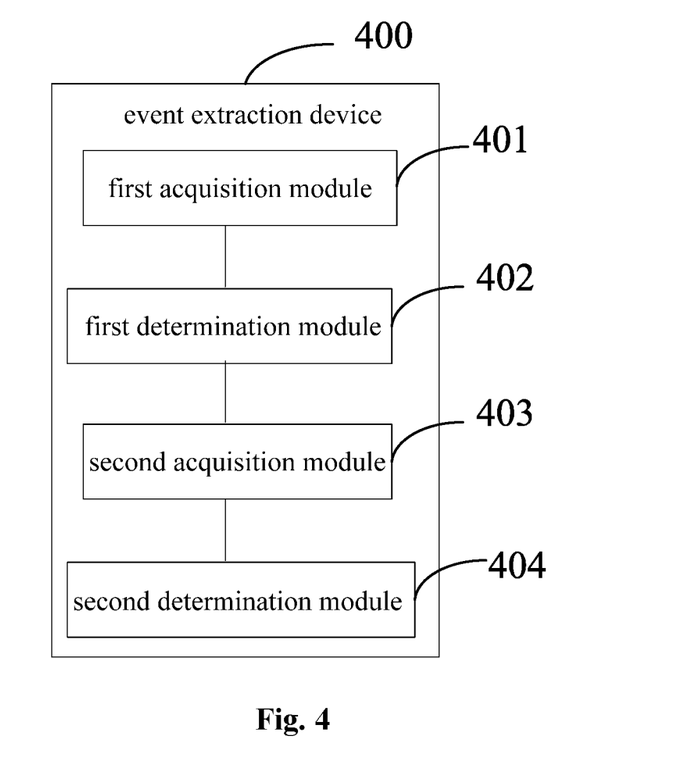
FIG. 4 is a schematic view showing an event extraction device according to one embodiment of the present disclosure.

As shown in FIG. 4, the present disclosure further provides in some embodiments an event extraction device 400 which includes: a first acquisition module 401 configured to acquire text information; a first determination module 402 configured to determine a plurality of pieces of question information ranked in a sequential order in accordance with the text information; a second acquisition module 403 configured to input vector information for each piece of question information into an extraction model in accordance with the sequential order to acquire extraction information for each piece of question information, the vector information including an answer mark vector; and a second determination module 404 configured to determine an event extraction result of the text information in accordance with the extraction information for each piece of question information.

In a possible embodiment of the present disclosure, an answer mark vector for first question information ranged first in the plurality of pieces of question information may be determined in accordance with an initial mark of the text information, and an answer mark vector for second question information ranked after the first question information in the plurality of pieces of question information may be determined in accordance with the extraction information for at least one piece of question information before the second question information.

In a possible embodiment of the present disclosure, the vector information may further include a position vector. The event extraction device may further include: a word segmentation module configured to perform word segmentation on each piece of question information to acquire at least one target word; a third acquisition module configured to acquire a position vector of each of the at least one target word; and a third determination module configured to determine a position vector of the question information in accordance with the position vector of each of the at least one target word.

In a possible embodiment of the present disclosure, the third acquisition module may include: a first acquisition sub-module configured to, when the quantity of entities included in the question information is greater than or equal to M and the quantity of verbs included in the question information is greater than or equal to N, acquire M entities and N verbs in the question information, M and N being each a positive integer; a calculation sub-module configured to calculate M first relative positions of each of the at least one target word relative to the M entities and N second relative positions of each of the at least one target word relative to the N verbs; a mapping sub-module configured to map the M first relative positions and the N second relative positions to normally-distributed vectors with predetermined dimensions, to acquire M first position vectors and N second position vectors; a second acquisition sub-module configured to splice the M first position vectors in accordance with a sequential order of the M entities in the question information to acquire a first spliced vector; a third acquisition sub-module configured to splice the N second position vectors in accordance with a sequential order of the N verbs in the question information to acquire a second spliced vector; and a fourth acquisition sub-module configured to splice the first spliced vector with the second spliced vector and taking a splicing result as the position vector of the target word.

In a possible embodiment of the present disclosure, the first acquisition sub-module may include: a first acquisition unit configured to, when the quantity of entities included in the question information is greater than M and the quantity of verbs included in the question information is greater than or equal to N, or when the quantity of verbs included in the question information is greater than N and the quantity of entities included in the question information is greater than or equal to M, perform syntax dependency analysis on the question information to acquire a plurality of dependency pairs; a second acquisition unit configured to select entities and verbs included in a same dependency pair in the plurality of dependency pairs to acquire m entities and n verbs, m and n being each a positive integer; a third acquisition unit configured to, when m is smaller than M, select i entities from the entities in the question information other than the m entities, i being a difference between M and m; and a fourth acquisition unit configured to, when n is smaller than N, select j verbs from the verbs in the question information other than the n verbs, j being a difference between N and n.

In a possible embodiment of the present disclosure, the first acquisition module may include: a first determination sub-module configured to determine an event type of the text information in accordance with the text information; a second determination sub-module configured to determine a plurality of event argument roles in accordance with the event type; a third determination sub-module configured to splice the event type with each event argument role in the plurality of event argument roles to determine a plurality of questions; a splicing sub-module configured to splice each question in the plurality of questions with the text information to acquire the plurality of pieces of question information; and a fourth determination sub-module configured to rank the plurality of pieces of question information corresponding to the event argument roles in accordance with an order of the event argument roles in the event type, so as to determine the plurality of pieces of question information ranked in the sequential order.

The event extraction device 400 is capable of implementing the event extraction method in FIG. 1, which will not be particularly defined herein.

According to the event extraction device 400 in the embodiments of the present disclosure, the text information may be acquired, and the plurality of pieces of question information ranked in the sequential order may be determined in accordance with the text information. Next, the vector information for each piece of question information may be inputted into the extraction model in accordance with the sequential order to acquire the extraction information for each piece of question information, and the vector information may include the answer mark vector. Then, the event extraction result of the text information may be determined in accordance with the extraction information for each piece of question information. During the extraction from the text information through the extraction model, the plurality of pieces of question information may be extracted sequentially. The answers corresponding to the plurality of pieces of question information may be different from each other, so when determining the answer for the question information extracted subsequently on the basis of the answer for the question information extracted previously, the answer for the question information extracted previously may be excluded. As a result, it is able to narrow a range of the extraction information for the question information to be extracted subsequently, thereby to improve the information extraction speed and accuracy.

The present disclosure further provides in some embodiments an electronic device and a computer-readable storage medium.

Figure 5:
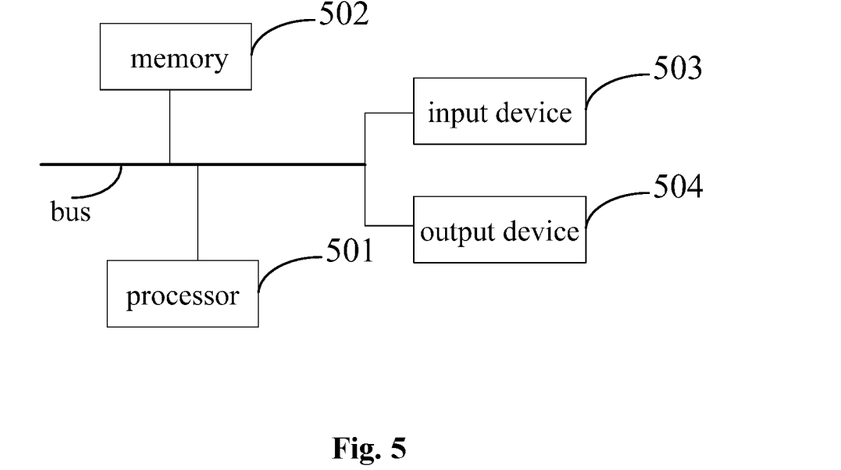
FIG. 5 is a block diagram of an electronic device for implementing the event extraction method according to one embodiment of the present disclosure.

FIG. 5 is a block diagram of the electronic device for implementing the event extraction method. The electronic device intends to include digital computers in various forms, e.g., laptop computer, desktop computer, work station, personal digital assistant, server, blade server, large-scale computer, or any other appropriate computer. The electronic device may also include mobile devices in various forms, e.g., personal digital processor, cellular phone, smart phone, wearable device, or any other similar computing device. The components, the connection relationship thereof, and the functions thereof are for illustrative purposes only, but shall not be used to limit the implementation of the present disclosure described and/or required in the context.

As shown in FIG. 5, the electronic device may include one or more processors 501, a memory 502, and interfaces for connecting the components. The interfaces may include high-speed interfaces and low-speed interfaces. The components may be interconnected via different buses, and installed on a public motherboard or installed in any other mode according to the practical need. The processor is configured to process instructions to be executed in the electronic device, including instructions stored in the memory and used for displaying graphical user interface (GUI) pattern information on an external input/output device (e.g., a display device coupled to an interface). In some other embodiments of the present disclosure, if necessary, a plurality of processors and/or a plurality of buses may be used together with a plurality of memories. Identically, a plurality of electronic devices may be connected, and each electronic device is configured to perform a part of necessary operations (e.g., as a server array, a group of blade serves, or a multi-processor system). In FIG. 5, one processor 501 is taken as an example.

The memory 502 may be just a non-transient computer-readable storage medium in the embodiments of the present disclosure. The memory is configured to store therein instructions capable of being executed by at least one processor, so as to enable the at least one processor to execute the above-mentioned event extraction method. In the embodiments of the present disclosure, the non-transient computer-readable storage medium is configured to store therein computer instructions, and the computer instructions may be used by a computer to implement the above-mentioned event extraction method.

As a non-transient computer-readable storage medium, the memory 502 may store therein non-transient software programs, non-transient computer-executable programs and modules, e.g., program instructions/modules corresponding to the above-mentioned event extraction method (e.g., the first acquisition module 401, the first determination module 402, the second acquisition module 405 and the second determination module 404 in FIG. 4). The processor 501 is configured to execute the non-transient software programs, instructions and modules in the memory 502, so as to execute various functional applications of a server and data processings, i.e., to implement the above-mentioned event extraction method.

The memory 502 may include a program storage area and a data storage area. An operating system and an application desired for at least one function may be stored in the program storage area, and data created in accordance with the use of the electronic device for implementing the event extraction method may be stored in the data storage area. In addition, the memory 502 may include a high-speed random access memory, or a non-transient memory, e.g., at least one magnetic disk memory, a flash memory, or any other non-transient solid-state memory. In some embodiments of the present disclosure, the memory 502 may optionally include memories arranged remotely relative to the processor 501, and these remote memories may be connected to the electronic device for implementing the event extraction method via a network. Examples of the network may include, but not limited to, Internet, Intranet, local area network, mobile communication network or a combination thereof.

The electronic device for implementing the event extraction method may further include an input device 503 and an output device 504. The processor 501, the memory 502, the input device 503 and the output device 504 may be connected to each other via a bus or connected in any other way. In FIG. 5, they are connected to each other via the bus.

The input device 503 may receive digital or character information, and generate a key signal input related to user settings and function control of the electronic device for implementing the event extraction method. For example, the input device 503 may be a touch panel, a keypad, a mouse, a trackpad, a touch pad, an indicating rod, one or more mouse buttons, a trackball or a joystick. The output device 504 may include a display device, an auxiliary lighting device (e.g., light-emitting diode (LED)) or a haptic feedback device (e.g., vibration motor). The display device may include, but not limited to, a liquid crystal display (LCD), an LED display or a plasma display. In some embodiments of the present disclosure, the display device may be a touch panel.

Various implementation modes of the described system and technology may be implemented in a digital electronic circuit system, an integrated circuit system, an application-specific integrated circuit (ASIC), hardware, firmware, software, or a combination thereof. These implementation modes may be implemented in one or more computer programs. The one or more computer programs may be executed and/or interpreted on a programmable system including at least one programmable processor. The programmable processor may be a special-purpose or general-purpose programmable processor, and it is configured to receive data and instructions from a storage system, at least one input device and at least one output device, and deliver data and instructions to the storage system, the at least one input device and the at least one output device.

These computer programs (also called as programs, software, software application or codes) may include machine instructions for the programmable processor, and they may be implemented using an advanced process and/or an object oriented programming language, and/or an assembly/machine language. The terms "machine-readable medium" and "computer-readable medium" used in the context may refer to any computer program products, devices and/or devices (e.g., magnetic disc, optical disc, memory or programmable logic device (PLD)) capable of providing the machine instructions and/or data to the programmable processor, including a machine-readable medium that receives a machine instruction as a machine-readable signal. The term "machine-readable signal" may refer to any signal through which the machine instructions and/or data are provided to the programmable processor.

In order to provide the interaction with a user and implement the described system and technology on the computer, the computer may include a display device for displaying information to the user (e.g., a cathode ray tube (CRT) or LCD monitor), a keyboard, and a pointing device (e.g., a mouse or trackball). The user may provide an input to the computer through the keyboard and the pointing device. Some other devices may also be used to provide the interaction with the user. For example, feedback provided to the user may be a sensor feedback in any form (e.g., visual feedback, auditory feedback or haptic feedback). In addition, the input may be received from the user in any forms (including sound input, voice input or haptic input).

The described system and technology may be implemented in a computing system including background components (e.g., a data server), a computing system including intermediate components (e.g., an application server), a computing system including frontend components (e.g., a subscriber computer having a GUI or a network browser, where the user may interact with the described system and technology through the GUI or the network browser), or a computing system including any combination of the background components, the intermediate components and the frontend components. The components of the system may be interconnected via digital data communications (e.g., a communications network) in any form or medium. Examples of the communications network may include local area network (LAN), wide area network (WAN) and Internet.

The computer system may include a client and a server. Usually, the client may be arranged far away from the server and interact with the server via the communications network. A relationship between the client and the service may be generated through running computer programs with a client-server relationship on corresponding computers.

The present disclosure has the following beneficial effects.

During the extraction of the text information through the extraction model, the plurality of pieces of question information may be extracted sequentially. The answers corresponding to the plurality of pieces of question information may be different from each other, so when an answer for the question information extracted subsequently is determined on the basis of an answer for the question information extracted previously, the answer for the question information extracted previously may be excluded, so as to narrow a range of the extraction information for the question information extracted subsequently, thereby to improve the information extraction speed and the information extraction accuracy.

When the extraction information for the second question information is extracted from the text information through the extraction model, the extraction information for at least one piece of question information ranked before the second question information may be taken into consideration. The answers corresponding to the plurality of pieces of question information may be different from each other, so when determining the answer for the second question information on the basis of the answer for the other question information, the answer for the other question information may be excluded. As a result, it is able to narrow a range when determining the extraction information for the second question information, thereby to improve the information extraction speed and accuracy.

Further, when the plurality of pieces of question information ranked in the sequential order is determined in accordance with the text information, the plurality of pieces of question information may be created in accordance with the plurality of event argument roles in the event type of the text information, and the sequential order of the plurality of pieces of question information may be determined in accordance with the order of the plurality of event argument roles in the event type, so as to sequentially determine the answers for the plurality of pieces of question information in accordance with the sequential order of the plurality of pieces of question information. In addition, when an answer for a current piece of question information is determined, the answer for the other piece of question information before the current piece of question information may be excluded, so as to narrow a search range of the answer for the current piece of question information, thereby to improve the efficiency and accuracy.

The vector information may further include the position vector of the question information. The word segmentation may be performed on each of the plurality of pieces of question information to acquire at least one target word, the position vector of each of the at least one target word may be acquired, and then the position vector of the question information may be determined in accordance with the position vector of each of the at least one target word. The position vector of the question information may include relative positions of each target word in the question information relative to the entities and verbs in the question information. Through making full use of relationships between each target word and the entities as well as the verbs, it is able to further improve the information extraction accuracy.

The position vector of the target word may include the relative positions of the target word relative to the entities and verbs in the question information. Through making full use of relationships between each target word and the entities as well as the verbs, it is able to further improve the information extraction accuracy.

When the quantity of entities in the question information is greater than M and the quantity of verb in the question information is greater than or equal to N, or when the quantity of verbs in the question information is greater than N and the quantity of entities in the question information is greater than or equal to M, the syntax dependency analysis may be performed on the question information to acquire the plurality of dependency pairs, and the entities and verbs in a same dependency pair may be selected in the plurality of dependency pairs, so as to improve the information extraction accuracy.

It should be appreciated that, the procedures in various forms mentioned herein above may be re-ordered, new steps may be added, or some steps may be deleted. For example, the steps mentioned in the embodiments of the present disclosure may be performed in parallel, or performed sequentially, or performed in different orders as long as it is able to acquire a desired effect, which will not be particularly defined herein.

The above embodiments shall not be used to limit the scope of the present disclosure. It should be appreciated that, a person skilled in the art may make further modifications, combinations, and substitutions in accordance with design requirements and other factors. Any modifications, equivalent substitutions and improvements made without departing from the spirit and principle of the present disclosure shall fall within the scope of the present disclosure.

What is claimed is:

1. An event extraction method, comprising:
   acquiring text information;
   determining a plurality of pieces of question information ranked in a sequential order in accordance with the text information;
   inputting vector information for each piece of question information into an extraction model in accordance with the sequential order to acquire extraction information for each piece of question information, the vector information comprising an answer mark vector; and
   determining an event extraction result of the text information in accordance with the extraction information for each piece of question information;
   wherein the vector information further comprises a position vector,
   wherein subsequent to determining the plurality of pieces of question information ranked in a sequential order in accordance with the text information, and prior to inputting the vector information for each piece of question information into the extraction model in accordance with the sequential order to acquire the extraction information for each piece of question information, the event extraction method further comprises:
   performing word segmentation on each piece of question information to acquire at least one target word;

acquiring a position vector of each of the at least one target word; and determining a position vector of the question information in accordance with the position vector of each of the at least one target word;

wherein the acquiring the position vector of each of the at least one target word comprises:

when the quantity of entities comprised in the question information is greater than or equal to M and the quantity of verbs comprised in the question information is greater than or equal to N, acquiring M entities and N verbs in the question information, M and N being each a positive integer;

calculating M first relative positions of each of the at least one target word relative to the M entities and N second relative positions of each of the at least one target word relative to the N verbs;

mapping the M first relative positions and the N second relative positions to normally-distributed vectors with predetermined dimensions, to acquire M first position vectors and N second position vectors;

splicing the M first position vectors in accordance with a sequential order of the M entities in the question information to acquire a first spliced vector;

splicing the N second position vectors in accordance with a sequential order of the N verbs in the question information to acquire a second spliced vector; and splicing the first spliced vector with the second spliced vector and taking a splicing result as the position vector of the target word;

wherein the acquiring the M entities and the N verbs in the question information when the quantity of entities comprised in the question information is greater than or equal to M and the quantity of verbs comprised in the question information is greater than or equal to N comprises:

when the quantity of entities comprised in the question information is greater than M and the quantity of verbs comprised in the question information is greater than or equal to N, or when the quantity of verbs comprised in the question information is greater than N and the quantity of entities comprised in the question information is greater than or equal to M, performing syntax dependency analysis on the question information to acquire a plurality of dependency pairs;

selecting entities and verbs comprised in a same dependency pair in the plurality of dependency pairs to acquire m entities and n verbs, m and n being each a positive integer;

when m is smaller than M, selecting i entities from the entities in the question information other than the m entities to obtain the i entities, i being a difference between M and m; and when n is smaller than N, selecting j verbs from the verbs in the question information other than the n verbs to obtain the j verbs, j being a difference between N and n.

2. The event extraction method according to claim 1, wherein an answer mark vector for first question information ranged first in the plurality of pieces of question information is determined in accordance with an initial mark of the text information, and an answer mark vector for second question information ranked after the first question information in the plurality of pieces of question information is determined in accordance with the extraction information for at least one piece of question information before the second question information.

3. The event extraction method according to claim 1, wherein the determining the plurality of pieces of question information ranked in the sequential order in accordance with the text information comprises:

determining an event type of the text information in accordance with the text information;

determining a plurality of event argument roles in accordance with the event type;

splicing the event type with each event argument role in the plurality of event argument roles to determine a plurality of questions;

splicing each question in the plurality of questions with the text information to acquire the plurality of pieces of question information; and ranking the plurality of pieces of question information corresponding to the event argument roles in accordance with an order of the event argument roles in the event type, so as to determine the plurality of pieces of question information ranked in the sequential order.

4. An electronic device, comprising at least one processor, and a memory communicating with the at least one processor and storing therein instructions executed by the at least one processor, wherein the at least one processor is configured to execute the instructions so as to implement the event extraction method according to claim 1.

5. The electronic device according to claim 4, wherein an answer mark vector for first question information ranged first in the plurality of pieces of question information is determined in accordance with an initial mark of the text information, and an answer mark vector for second question information ranked after the first question information in the plurality of pieces of question information is determined in accordance with the extraction information for at least one piece of question information before the second question information.

6. A non-transient computer-readable storage medium storing therein computer instructions, wherein the computer instructions are executed by a computer so as to implement the event extraction method according to claim 1.

7. The electronic device according to claim 4, wherein the determining the plurality of pieces of question information ranked in the sequential order in accordance with the text information comprises:

determining an event type of the text information in accordance with the text information;

determining a plurality of event argument roles in accordance with the event type;

splicing the event type with each event argument role in the plurality of event argument roles to determine a plurality of questions;

splicing each question in the plurality of questions with the text information to acquire the plurality of pieces of question information; and ranking the plurality of pieces of question information corresponding to the event argument roles in accordance with an order of the event argument roles in the event type, so as to determine the plurality of pieces of question information ranked in the sequential order.

\* \* \* \* \*